United States Patent [19]
Shu-Ming

[11] Patent Number: 5,883,718
[45] Date of Patent: Mar. 16, 1999

[54] OPTICAL SENSING SYSTEM FOR DETECTING DISPLACEMENTS OF A SLIDABLE FRAME ALONG AN ELONGATED PLATE

[75] Inventor: Liu Shu-Ming, Taipei, Taiwan

[73] Assignee: Primax Electronics Ltd., Taiwan

[21] Appl. No.: 984,446

[22] Filed: Dec. 3, 1997

[51] Int. Cl.$^6$ ..................................................... G01B 11/14
[52] U.S. Cl. ..................... 356/373; 350/375; 250/237 G; 345/184
[58] Field of Search ..................................... 356/373, 374, 356/375; 33/706, 707, 708; 345/161, 184; 250/237 G, 229

[56] References Cited

U.S. PATENT DOCUMENTS

| | | | |
|---|---|---|---|
| 3,749,925 | 7/1973 | Hertrich | 250/237 G |
| 3,867,036 | 2/1975 | Detwiler et al. | 250/237 G |
| 4,135,086 | 1/1979 | Baba | 250/237 G |
| 4,786,803 | 11/1988 | Majette et al. | 356/375 |
| 5,558,329 | 9/1996 | Liu | 345/161 |

Primary Examiner—Richard A. Rosenberger
Attorney, Agent, or Firm—Winston Hsu

[57] ABSTRACT

This invention provides an optical sensing system for detecting displacements of a slidable frame along an elongated plate of the system and generating corresponding position or displacement signals. The optical sensing system comprises a housing, an elongated plate horizontally installed in the housing having a plurality of positioning holes and a plurality of parallel conductors installed in it, a slidable frame having a sliding hole in its middle for slidably engaging the elongated plate, an optical sensor installed in the frame and slidably wired to the parallel conductors of the elongated plate for detecting the positioning holes of the elongated plate and generating corresponding sensing signals, and a control circuit wired to the parallel conductors of the elongated plate for converting the sensing signals into corresponding position signals or displacement signals.

8 Claims, 2 Drawing Sheets

OPTICAL SENSING SYSTEM FOR DETECTING DISPLACEMENTS OF A SLIDABLE FRAME ALONG AN ELONGATED PLATE

BACKGROUND OF THE INVENTION

1. Field of the Invention

The present invention relates to an optical sensing system, and more particularly, to an optical sensing system for detecting displacements of a slidable frame along an elongated plate.

2. Description of the Prior Art

Linear variable resistors are widely used as input devices in electronic systems. A slidable button is usually provided to engage with a fixed resistor so as to change its resistance. The contacting portions of such a variable resistor may easily get damaged after frequent use which will cause inaccuracy in measuring the resistance of the variable resistor.

SUMMARY OF THE INVENTION

It is therefore a primary objective of the present invention to provide an optical sensing system for measuring displacements of a slidable frame along an elongated plate to replace the traditional linear variable resistors so that the above mentioned problem can be solved.

In a preferred embodiment, the optical sensing system comprises a housing, an elongated plate, a slidable frame, a sensor, and a control circuit. The housing comprises a chamber having an elongated opening at its top. The elongated plate is horizontally placed below the elongated opening inside the chamber of the housing. It further comprises a plurality of positioning holes installed along the elongated direction of the elongated plate and a plurality of parallel conductors installed on the surface of the elongated plate. The slidable frame comprises a sliding hole in its middle portion and a button at its top. The sliding hole of the slidable frame is mounted on the elongated plate in a slidable manner. The button is bulging out of the elongated opening so that it can be used to control the movement of the slidable frame along the elongated plate. The optical sensing system further comprises an optical sensor installed in the slidable frame and slidably wired to the parallel conductors of the elongated plate for detecting the positioning holes on the plate and generating corresponding sensing signals, and a control circuit installed in the housing and wired to the parallel conductors of the elongated plate for converting the sensing signals into corresponding position signals or displacement signals.

It is an advantage of the present invention that the optical sensing system uses the optical sensor to detect the positioning holes along the elongated plate for measuring displacements of the slidable frame. As long as the optical sensor works properly, frequent use of the slidable frame will not cause any damage to the optical sensor or to the positioning holes since there is no physical contact in between.

This and other objectives of the present invention will no doubt become obvious to those of ordinary skill in the art after having read the following detailed description of the preferred embodiment which is illustrated in the various Figures and drawings.

DETAILED DESCRIPTION OF THE PREFERRED EMBODIMENT

Figure 1:
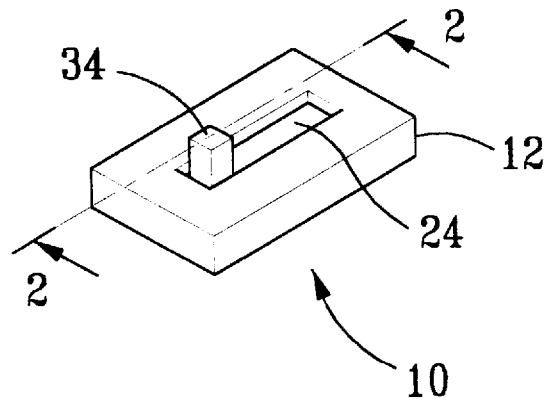
FIG. 1 is a perspective view of an optical sensing system according to the present invention.
Figure 2:
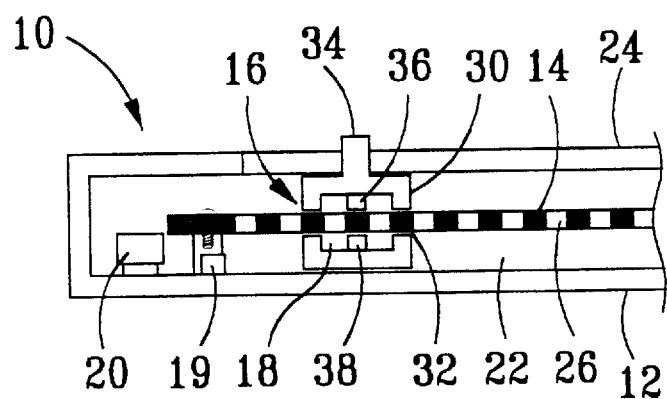
FIG. 2 is a cross-sectional view along line 2—2 of the optical sensing system shown in FIG. 1.
Figure 3:
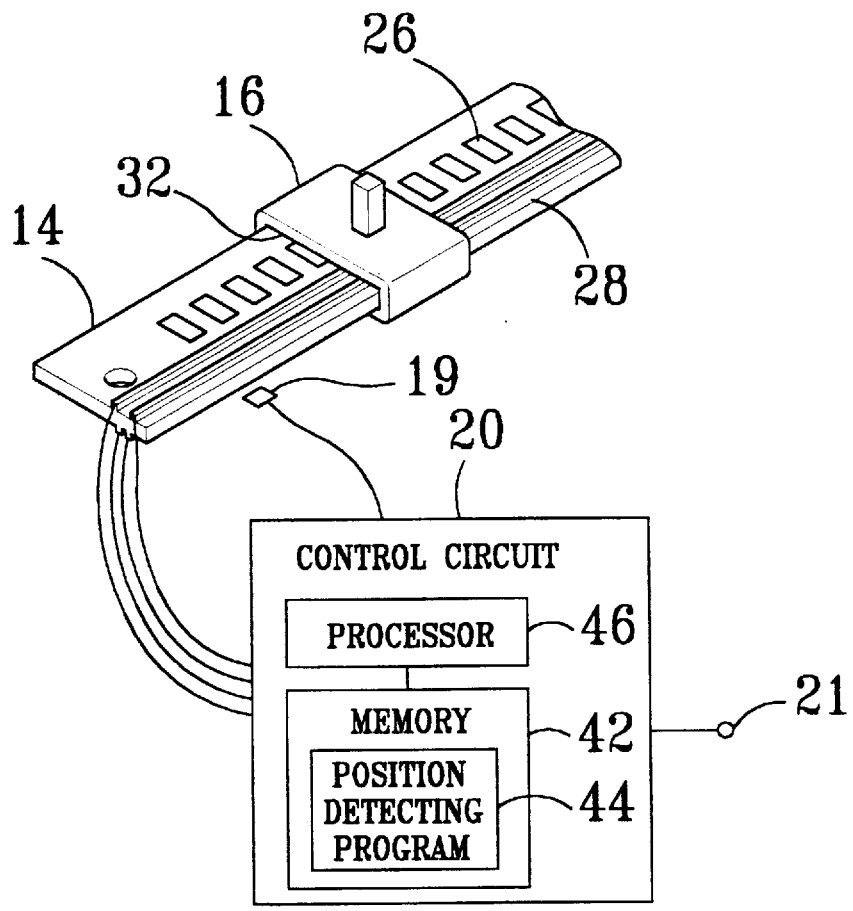
FIG. 3 is a diagrammatic view of various components of the optical sensing system shown in FIG. 1.

Please refer to FIGS. 1 to 3. FIG. 1 is a perspective view of an optical sensing system 10 according to the present invention. FIG. 2 is a cross-sectional view along line 2—2 of the optical sensing system 10 shown in FIG. 1. FIG. 3 is a diagrammatic view of various components of the optical sensing system 10 shown in FIG. 1. The system 10 comprises a housing 12, an elongated plate 14, a slidable frame 16, an optical sensor 18, a position detector 19, and a control circuit 20. The housing 12 has a chamber 22 installed in it and an elongated opening 24 at its top. The elongated plate 14 is horizontally installed inside the chamber 22 and positioned under the elongated opening 24. The plate 14 comprises a plurality of positioning holes 26 arranged along the elongated direction of the elongated plate 14, and a plurality of parallel conductors 28 installed on the surface of the elongated plate 14. The slidable frame 16 comprises a frame body 30 having a sliding hole 32 in the middle of the frame body 30 and a button 34 at the top of the frame body 30. The sliding hole 32 of the slidable frame 16 is mounted on the plate 14 in a slidable manner. The button 34 is bulging out of the elongated opening 24 so that it can be used to move the slidable frame 16 along the plate 14.

The optical sensor 18 is installed inside the frame 30 for sensing the positioning holes 26 of the plate 14 and generating corresponding sensing signals so that the displacement of the slidable frame 16 on the plate 14 can be calculated according to the sensing signals. The function of the optical sensor 18 is similar to the optical sensor used in a traditional pointing device such as a mouse. The optical sensor 18 comprises a light emitter 36 installed at one side of the plate 14, and a light receiver 38 installed at the other side of the plate 14 for receiving light emitted from the light emitter 36 through the positioning holes 26 and generating corresponding sensing signals. The optical sensor 18 is slidably and electrically wired to the parallel conductors 28. A control circuit 20 installed in the housing 12 is also wired to the parallel conductors 28 of the plate 14 so as to provide electric power to the sensor 18 and convert the sensing signals generated by the sensor 18 into corresponding displacement signals.

The control circuit 20 comprises a memory 42 for storing programs and data, and a processor 46 for executing a position detecting program 44 stored in the memory 42. The position detecting program 44 is used for converting the sensing signals generated by the sensor 18 into corresponding displacement signals and transmitting the displacement signals over an output port 21.

The control circuit 20 not only can convert the sensing signals into displacement signals, but also can convert the sensing signals into position signals to indicate the position of the slidable frame 16 on the plate 14. The position detector 19 is installed in a predetermined reference position for detecting the slidable frame 16 on the plate 14. When using the optical sensing system 10, a user has to move the slidable frame 16 to the position detector 19 first to establish the position of the slidable frame 16. The control circuit 20 will store the reference position in the memory 42 when the slidable frame 16 is detected by the position detector 19. And then the position detecting program 44 will calculate the displacement of the slidable frame 16 along the plate 14 according to the sensing signals generated by the sensor 18, update the position of the slidable frame 16 stored in the memory 42, and generate position signals over the output port 21 according to the position recorded in the memory 42. Whenever the slidable frame 16 is detected by the position detector 19, the control circuit 20 will immediately reset the position of the slidable frame 16 to the reference position.

Except for the above mentioned method which uses the position detector 19 to establish the position of the slidable frame 16, there is another method to set the position of the slidable frame 16. This method is very similar to the calibration method used by a traditional joystick. A user has to move the slidable frame 16 to both ends of the plate 14 so that the control circuit 20 can establish a position within a maximum moving range for the slidable frame 16 and store the position in the memory 42. And then the position detecting program 44 will update the position of the slidable frame 16 according to the sensing signals generated by the sensor 18 and generate the position signals according to the position stored in the memory 42.

Figure 4:
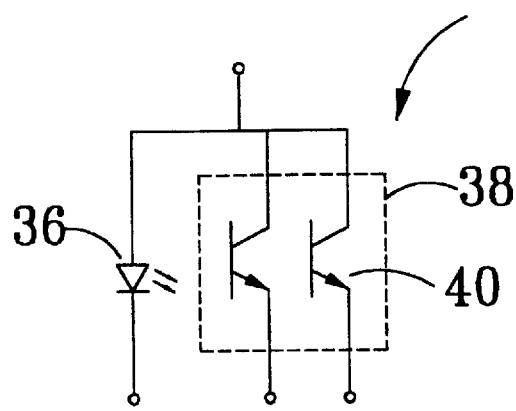
FIG. 4 is a circuit diagram of the optical sensor shown in FIG. 2.

Please refer to FIG. 4. FIG. 4 is a circuit diagram of the optical sensor 18. The optical sensor 18 comprises a light emitter 36 and a light receiver 38. The light emitter 36 and light receiver 38 are wired to the control circuit 20 through the parallel conductors 28 installed over the surface of the elongated plate 14. The light emitter 36 is an emitting diode, and the light receiver 38 comprises two light detectors 40 arranged along the elongated direction of elongated plate 14 for detecting light passing through the positioning holes 26 over the elongated plate 14. The control circuit 20 shown in FIG. 3 will then use sensing signals generated by the sensor 18 to calculate the displacement of the slidable frame 16 and generate the corresponding displacement signals or position signals.

Comparing with traditional linear variable resistors, frequent use of the slidable frame 16 will not cause any damage to the optical sensor 18 or the positioning holes 26. As long as the optical sensor 18 works properly, the control circuit 20 can always accurately detect the displacement of the slidable frame 16 and generate corresponding displacement or position signals.

Those skilled in the art will readily observe that numerous modifications and alternations of the device maybe made while retaining the teachings of the invention. Accordingly, the above disclosure should be constructed as limited only by the metes and bounds of the appended claims.

What is claimed is:

1. An optical sensing system comprising:

a housing comprising a chamber in it;

an elongated plate horizontally installed inside the chamber having a plurality of positioning holes and parallel conductors installed in it;

a slidable frame having a sliding hole in its middle for slidably engaging the elongated plate;

an optical sensor installed in the frame and slidably wired to the parallel conductors of the elongated plate for detecting the positioning holes of the elongated plate and generating corresponding sensing signals; and a control circuit installed in the housing and wired to the parallel conductors of the elongated plate for converting the sensing signals generated by the sensor into corresponding position signals or displacement signals.

2. The optical sensing system of claim 1 wherein the positioning holes of the elongated plate are linearly installed on the elongated plate along a sliding direction of the slidable frame.

3. The optical sensing system of claim 1 wherein the optical sensor comprises a light emitter positioned at one side of the elongated plate, and a light receiver positioned at another side of the elongated plate for receiving light emitted from the light emitter through the positioning holes and generating the corresponding sensing signals.

4. The optical sensing system of claim 3 wherein the light receiver comprises two light detectors arranged along a sliding direction of the frame for detecting light passing through the positioning holes and generating the sensing signals corresponding to a displacement of the slidable frame along the frame, and wherein the control circuit calculates the displacement of the slidable frame according to the sensing signals and converts it into corresponding displacement signals.

5. The optical sensing system of claim 1 wherein the control circuit comprises:

a memory for storing programs and data;

a position detecting program stored in the memory; and a processer for executing the position detecting program;

wherein the position detecting program detects a maximum moving range of the slidable frame along the elongated plate according to a calibrating procedure actuated by a user for detecting a position of the slidable frame along the elongated plate wherein the position detecting program generates the position signals to indicate the position of the slidable frame along the elongated plate according to the detected position and the sensing signals.

6. The optical sensing system of claim 1 further comprising a position detector installed in the housing for detecting the slidable frame in a predetermined position wherein the control circuit generates the position signal to indicate the position of the slidable frame along the elongated plate according to outputs of the position detector and the sensing signals.

7. The optical sensing system of claim 6 wherein the control circuit comprises:

a memory for storing programs and data;

a position detecting program stored in the memory; and a processer for executing the position detecting program;

wherein when the slidable frame is detected by the position detector, the position detecting program will record the position of the slidable frame in the memory, and when the slidable frame is slided along the elongated plate, the position detecting program will update the position recorded in the memory according to the sensing signals and generate the position signals according to the position stored in the memory.

8. The optical sensing system of claim 1 wherein the housing further comprises an elongated opening at its top and the slidable frame further comprises a button on its top which is bulging out of the elongated opening so that the slidable frame can be slidably moved along the elongated plate by using the button.

* * * * *